UNITED STATES PATENT OFFICE 2,265,155

ACTIVATED INSECTICIDE COMPOSITION

Robert J. Geary, Blue Point, N. Y., assignor to The Dow Chemical Company, Midland, Mich., a corporation of Michigan No Drawing. Application September 11, 1940, Serial No. 356,351

17 Claims. (Cl. 167—24)

This invention relates to insecticides and is particularly concerned with activated compositions comprising rotenone and a phenothioxin compound.

Extracts of insecticidal plant products are widely used for the control of insect pests. Compositions comprising rotenone or rotenone-containing derris-type resins are toxic to many insects but relatively slow in their action and are effective for a short period only. It is not possible to obtain commercial control of certain insect and mite pests with rotenone except by using such high concentrations of the toxicant as make such application economically infeasible. Many synthetic organic compounds have been proposed either as substitutes for rotenone or to be used in combination therewith. Almost without exception, however, the high concentrations of such synthetic toxicants required gave rise to problems of irritation and odor. A further objection to the use of many synthetic toxicants in combination with rotenone lies in the reactivity of rotenone therewith so that the mixtures are less effective than might be anticipated. Furthermore, many of the synthetic materials heretofore proposed such as thiocyanates, complex ether derivatives, complex amines, and dinitrophenols are so costly as to preclude their use on a large scale.

A specific problem in parasite control which is not met by the use of rotenone alone is that of killing red spiders and their eggs in greenhouse work. Roses and other plants commonly raised under glass frequently become so heavily infested with red spiders and related mite and insect pests as seriously to reduce the yield of marketable blooms. Such conditions require immediate and effective treatment if substantial plant injury is to be avoided. This problem is further complicated by the tender nature of the vegetative growth affected, whereby many toxicants ordinarily suitable for insect and spider control cannot be used without materially injuring the plant.

Where rotenone sprays are employed on spider-infested vegetation, there appears to be a definite limit in percentage control obtainable. Increasing the amount of the toxicant employed does not increase materially the mortality of the pests. This is probably due to the fact that rotenone and derris resins are transitory in their effect and are not good ovicides, so that there is not control of reinfestation caused by the hatching of existing eggs. Repeated sprays, therefore, are required with a resultant increased cost of pest control. Furthermore, since the rotenone and derris resin sprays frequently contain an oily material as a carrier, such repeated plant treatments result in cumulative oil injury.

Among the objects of the present invention is to provide an activator for rotenone and rotenone-containing derris-type resins. A further object is to provide improved compositions for exterminating common agricultural parasites and household insect pests which will be more quickly and more permanently toxic to insects than many compositions at present employed. An additional object is to provide a contact insecticide comprising rotenone or rotenone-containing derris-type resins as an active toxicant which will kill a percentage of insects approaching the knockdown or moribund control initially obtained upon application of the composition. A still further object is to provide an addition agent for rotenone and rotenone containing derris type resins which will be readily and economically synthesizable in any desired amount, and which will not be characterized by the irritating properties, and toxicity to humans with which many other synethetic toxicants have been heretofore identified. Other objects of the invention will become apparent from the following description and examples.

According to the present invention, phenothioxin and homologs and analogs thereof are employed to activate rotenone and related plant extract toxicants and particularly rotenone-containing derris-type resins and as a supplementary toxicant in mixture therewith. In the presence of phenothioxin and related compounds the ovicidal and insecticidal activity of rotenone is greatly increased so that compositions comprising such mixtures have a wider range of application and utility than is characteristic of pest control materials in which rotenone alone is employed as the active toxicant. This increase in effectiveness is in excess of what might be predicted from a knowledge of the individual toxicities of the materials concerned and makes practical the use of reduced amounts of rotenone and rotenone-containing derris-type resins in spray and dust compositions. The combination of toxicants does not have an objectionable odor, and is substantially non-toxic to humans and higher animals. The mixture has little or no effect upon foliage in the amounts required to control most insect pests.

In carrying out the invention, rotenone or rotenone-containing derris-type resins are mixed together with the phenothioxin compound to form a concentrate. To facilitate the preparation of the concentrate and to increase its utility and compatibility with various diluents, a suitable non-corrosive organic solvent may be employed therewith. Other modifiers, such as plant hormones, solubilizing agents, emulsifiers, and dispersing agents, may be advantageously used with such mixtures. The exact ingredients and amounts thereof employed are dependent upon the manner in which the concentrate is to be subsequently utilized for pest control.

In the control of agricultural insect pests, the mixed toxicants with which the present invention is concerned may be employed as constituents of either spray or dust compositions. For example, the mixture may be employed in oil emulsions either dissolved in the oil or dispersed in the aqueous phase. The mixture may also be employed in water suspension in the presence of a suitable wetting or dispersing agent. In a further adaptation, the toxicant mixture may be absorbed in or adsorbed on finely divided carriers such as diatomaceous earth, bentonite, talc, wood flour and the like, to obtain compositions adapted to be employed as dusts or to be dispersed in spray mixtures. Similarly, the toxicant mixture may be incorporated in other standard type insecticidal composition, either as the sole toxic ingredient of such composition or in combination with common insecticidal materials.

In preparing my new compositions, 1 part by weight of rotenone or an equivalent amount of an extract of derris, cubé, barbasco, cracca, timbo, or other product comprising rotenone, or the finely ground plant material itself, is intimately mixed with from about 1 to about 16 parts by weight of the phenothioxin or phenothioxin derivative. A preferred composition comprises 1 part of pure rotenone or its equivalent with from 2 to 5 parts of the activator. Such mixture may be employed as a concentrate or modified with various carriers, diluents, solubilizing agents, dispersing or wetting agents, to produce a mixture comprising relatively high percentages of rotenone and activator and adapted to be subsequently incorporated in small amounts into insecticide dust or spray compositions.

A preferred embodiment of the invention resides in compositions comprising the phenothioxin activator in combination with a mixture of rotenone or rotenone containing derris type resins and dibenzyl-disulphide. Such a blending of toxicants and activator yields a parasiticidal material which in diluted form is effective against a wide range of plant pests and has exceptional ovicidal properties. In such mixture the preferred ratio of rotenone or derris resin to phenothioxin is as set forth above. The dibenzyl-disulphide is preferably employed in amount of from 1 to 16 parts by weight per part of rotenone. The mixture may be further modified with wetting, dispersing, and solubilizing agents substantially as described for the combination of rotenone and phenothioxin.

EXAMPLE 1

A toxicant mixture was prepared by mixing 62.5 parts by weight of derris resins comprising 35 per cent by weight of rotenone with 37.5 parts by weight of phenothioxin. A portion of this product was compounded with a vegetable oil consisting of equal parts by weight of coconut oil and rape seed oil to form a concentrate which was thereafter employed in the preparation of a dilute aqueous spray and applied to greenhouse plants for the control of red spider. Simultaneous determinations were made with compositions in which various constituents of the concentrate were omitted in order to establish the function of phenothioxin and rotenone in the mixture. Beta - (4 - tertiarybutyl-phenoxy) - ethanol was included in each composition as a solubilizing agent for the derris. A dispersing, spreading, and emulsifying agent consisting of the reaction product of mannitol and coconut oil and comprising a substantial proportion of a complex lauric acid ester product of reaction was used in each composition to aid in obtaining a relatively stable oil-in-water emulsion. The following concentrates were employed:

*Composition A*

| | Grams |
|---|---|
| Coconut oil | 52.5 |
| Rape seed oil | 52.5 |
| Solubilizing agent | 20 |
| Spreading and dispersing agent | 36 |
| Water | 16.5 |
| | 177.5 |

*Composition B*

| | Grams |
|---|---|
| Coconut oil | 52.5 |
| Rape seed oil | 52.5 |
| Solubilizing agent | 20 |
| Spreading and dispersing agent | 36 |
| Derris resins | 7.5 |
| Water | 9 |
| | 177.5 |

*Composition C*

| | Grams |
|---|---|
| Coconut oil | 52.5 |
| Rape seed oil | 52.5 |
| Solubilizing agent | 20 |
| Spreading and dispersing agent | 36 |
| Phenothioxin | 4.5 |
| Water | 12 |
| | 177.5 |

*Composition D*

| | Grams |
|---|---|
| Coconut oil | 52.5 |
| Rape seed oil | 52.5 |
| Solubilizing agent | 20 |
| Spreading and dispersing agent | 36 |
| Derris resins | 7.5 |
| Phenothioxin | 4.5 |
| Water | 4.5 |
| | 177.5 |

Each composition applied to the spider infested plants was prepared by dispersing 1 part by weight of one of the concentrates in 1000 parts of water. The plants employed in the determinations were roses. The values given for the percentage control accomplished with each spray composition represent the average obtained in a series of nine determinations.

Composition D, containing the derris resins and phenothioxin, gave a 69.7 per cent control of red spider. A check determination, in which no spray was applied to the rose foliage, showed that an average of 4 per cent of the spiders died over the 2 day period elapsing between the time of application and mortality counts on the sprayed insects.

Composition A, in which both derris resins and activator were omitted, gave a control in 2 days of 31.2 per cent of the red spider. Composition B, in which derris resins were employed in the absence of the activator, gave a control of 57.2 per cent. The addition of derris resins therefore resulted in an increase in toxicity of 26 per cent. Composition C, in which the phenothioxin was used in the absence of the derris resins, gave a control of 37.7 per cent. An increase of 6.5 per cent therefore resulted from the use of phenothioxin alone in the oily spray material. In the amounts employed Composition D caused no injury to violet, rose, and bean foliage.

EXAMPLE 2

A toxicant mixture of derris resins and phenothioxin, as described in Example 1, was dissolved in an excess of ethylene chloride, and used to impregnate diatomaceous earth. The mixture was then warmed to drive off the solvent and obtain a dust composition adapted to be employed for the control of pea aphis and other insects infesting truck garden crops. In a similar manner dust mixtures may be prepared employing other solid carriers. The following are representative of such compositions:

Composition E

| | Parts by weight |
|---|---|
| Derris resins | 0.313 |
| Phenothioxin | 0.187 |
| Diatomaceous earth | 99.5 |
| | 100.00 |

Composition F

| | Parts by weight |
|---|---|
| Derris resins | 0.208 |
| Phenothioxin | 0.125 |
| Petroleum oil | 1.66 |
| Walnut shell flour | 98. |
| | 100.00 |

Composition G

| | Parts by weight |
|---|---|
| Derris resins | 0.416 |
| Phenothioxin | 0.250 |
| Finely divided sulphur | 1.0 |
| Talc | 98.334 |
| | 100.00 |

Composition H

| | Parts by weight |
|---|---|
| Derris resins | 0.208 |
| Phenothioxin | 0.125 |
| Pyrethrins | 0.2 |
| Diatomaceous earth | 99.467 |
| | 100.00 |

The foregoing compositions are adapted to be employed as dusts or dispersed in water as sprays for the control of a wide variety of insect pests.

EXAMPLE 3

Toxicant concentrates comprising the homologs and analogs of phenothioxin were prepared substantially as described in Example 1. Representative compositions were as follows:

Composition I

| | Grams |
|---|---|
| Coconut oil | 52.5 |
| Rape seed oil | 52.5 |
| Solubilizing agent | 20 |
| Spreading and dispersing agent | 36 |
| Derris resins | 7.5 |
| Mixed mono- and di-butyl-phenothioxin (sp. gr. 1.098 at 25°/25° C.) | 4.5 |

Composition J

| | Grams |
|---|---|
| Coconut oil | 52.5 |
| Rape seed oil | 52.5 |
| Solubilizing agent | 20 |
| Spreading and dispersing agent | 36 |
| Derris resins | 7.5 |
| 1-chloro-phenothioxin (B. P. 169–194° C. at 10 mm. pressure) | 4.5 |

Composition K

| | Grams |
|---|---|
| Coconut oil | 52.5 |
| Rape seed oil | 52.5 |
| Solubilizing agent | 20 |
| Spreading and dispersing agent | 36 |
| Derris resins | 7.5 |
| Mixed mono- and di-cyclohexyl-phenothioxin (sp. gr. 1.169 at 25°/25° C.) | 4.5 |

Composition L

| | Grams |
|---|---|
| Coconut oil | 52.5 |
| Rape seed oil | 52.5 |
| Solubilizing agent | 20 |
| Spreading and dispersing agent | 36 |
| Derris resins | 7.5 |
| Mono-dodecyl-phenothioxin (sp. gr. 1.027 at 25°/25° C.) | 4.5 |

Composition M

| | Grams |
|---|---|
| Coconut oil | 52.5 |
| Rape seed oil | 52.5 |
| Solubilizing agent | 20 |
| Spreading and dispersing agent | 36 |
| Derris resins | 7.5 |
| Mono-heptadecyl-phenothioxin (B. P. 260°–315° C. at 5 mm. pressure) | 4.5 |

Composition N

| | Grams |
|---|---|
| Coconut oil | 52.5 |
| Rape seed oil | 52.5 |
| Solubilizing agent | 20 |
| Spreading and dispersing agent | 36 |
| Derris resins | 7.5 |
| Mono-octyl-phenothioxin (sp. gr. 1.066 at 25°/25° C.) | 4.5 |

Composition O

| | Grams |
|---|---|
| Coconut oil | 52.5 |
| Rape seed oil | 52.5 |
| Solubilizing agent | 20 |
| Spreading and dispersing agent | 36 |
| Derris resins | 7.5 |
| 1-phenyl-phenothioxin (M. P. 68–70° C.) | 4.5 |

Composition P

| | Grams |
|---|---|
| Coconut oil | 52.5 |
| Rape seed oil | 52.5 |
| Solubilizing agent | 20 |
| Spreading and dispersing agent | 36 |
| Derris resins | 7.5 |
| Di-propyl-phenothioxin (sp. gr. 1.146 at 25°/25° C.) | 4.5 |

Each of the foregoing concentrates was diluted to obtain spray compositions comprising 1 part by weight of the concentrate to 1000 parts of water. The spray emulsions obtained were applied to the foliage of string beans for the control of red spider. In each instance a control was obtained of from 75 to 80 per cent of the pests without causing any injury to the bean foliage.

Example 4

12.813 pounds of phenothioxin was added to a mixture consisting of 34.375 pounds of derris resins (containing 35 per cent by weight of rotenone), 12.813 pounds dibenzyl-disulphide and 473.75 pounds of an oil containing approximately 30 per cent by weight of higher aliphatic alcohols and 70 per cent of mineral oil having an unsulphonatable residue of 83 per cent. 155 pounds of the dispersing, spreading and emulsifying agent described in Example 1 and 134.375 pounds of beta-(4-tertiarybutyl-phenoxy)-ethanol were also added to the mixture. The entire batch was then warmed and stirred to obtain a homogeneous product.

10 parts by weight of this concentrate was emulsified with 4000 parts of water to obtain a spray composition which gave minimum controls of 90 per cent and 75 per cent against adult red spider and spider eggs, respectively. A check composition in which the phenothioxin and dibenzyl-disulphide were omitted gave a control of 70 per cent against red spiders and 20 per cent against spider eggs at a comparable dilution.

The foregoing activated concentrate at a dilution of 1 to 400 was sprayed on 10 acres of mixed cucumber and potato planting for the control of aphis, whereby a substantially complete control of these pests was obtained. Adjacent potato vines which were not treated with the composition, continued to be badly infested with aphis and were badly damaged during the growing season. The spray residue on the treated plants exerted a repellant effect as was evidenced by the fact that over a period of 10 days there was but slight tendency for transfer or migration of aphis from the infested plants to the sprayed vines. No injury was observed to either the potato or cucumber foliage.

Example 5

0.25 gram of phenothioxin and 0.1 gram of derris resins (containing 25 per cent by weight rotenone) were dissolved in 12.5 milliliters of methyl-ethyl ketone. This concentrate was diluted with 87.5 milliliters of light petroleum distillate to form a household insecticide for the control of flies, moths, roaches and the like. When tested according to the Peet-Grady method as described in Soap 8, No. 4, 1932, this composition killed an average of 87.1 per cent of three day old houseflies in 48 hours. An analogous composition in which the phenothioxin was omitted gave a control of 77.6 per cent. In the absence of the derris resins, the phenothioxin gave a kill of 8.6 per cent.

In a similar manner phenothioxin compounds other than those set forth in the examples may be employed as activators for rotenone. Representative of such derivatives are 1-benzyl-phenothioxin, 3-chloro-phenothioxin, 1.3-dichloro-phenothioxin, 3-bromo-phenothioxin, 1.3-di-tertiary-butyl-phenothioxin, and the like.

While the foregoing examples are concerned primarily with mixtures of rotenone products with phenothioxin compounds, other insecticidal materials may be included in such mixtures if desired, provided only that the activated rotenone mixture is compatible therewith. Representative of supplementary toxicants which may be employed are organic thiocyanates, cresylic acid, copper oxides, Bordeaux mixture, acid lead arsenate, and chloronaphthalenes.

Among the solubilizing agents and wetting and dispersing agents which may be substituted for those shown in the examples are n-octyl alcohol, beta (2.4.6-trichlorophenoxy)-beta'-chlorodiethyl ether, liquid polychloro-pentanes, anisole, safrol, toluene, xylene, ortho-dichloro-benzene, sodium lauryl sulphate, sodium oleate, sodium monobutyl-phenylphenol-sulphonic acid, glyceryl oleate, oleic acid, and triethanol amine.

Other oils which may be used to supplement or replace those shown in certain of the examples include tall oil, corn oil, soya bean oil, peanut oil, olive oil, and menhaden oil.

The compositions with which the present invention is concerned may be employed also for the control of Mexican bean beetle, Colorado potato beetle, cabbage worm, rose chafer, house flies, cock roaches, mosquitoes, and young mealy bugs, and the eggs thereof.

The phrase "non-corrosive organic solvent," as herein employed, refers to any organic solvent material non-reactive with the toxicants herein described and non-injurious to the skin and general health of humans. Representative of such solvents are petroleum distillates, animal or vegetable oils, ethylene chloride, methyl-ethyl ketone, hydrogenated naphthalene, dichloro-diethyl ether, and methyl, ethyl, propyl, and butyl alcohols. A preferred group of solvents consists of those materials which are capable of dissolving the toxicant mixtures to which the present invention is directed.

I claim:

1. An insecticidal composition comprising a substance selected from the group consisting of rotenone and rotenone-containing derris-type resins in combination with a material selected from the class consisting of phenothioxin and halogen, alkyl, cycloalkyl, aryl, and aralkyl substituted derivatives thereof in amount sufficient to serve as an activator for the rotenone product.

2. An insecticidal composition comprising a non-corrosive organic solvent and dissolved therein a substance selected from the group consisting of rotenone and rotenone-containing derris-type resins in combination with a material selected from the class consisting of phenothioxin and halogen, alkyl, cycloalkyl, aryl, and aralkyl substituted derivatives thereof in amount sufficient to serve as an activator for the rotenone product.

3. An insecticide concentrate comprising an oil, a substance selected from the group consisting of rotenone and rotenone-containing derris-type resins, a solubilizing agent for the rotenone product, and a material selected from the class consisting of phenothioxin and halogen, alkyl, cycloalkyl, aryl, and aralkyl substituted derivatives thereof in amount sufficient to serve as an activator for the rotenone product.

4. An insecticidal spray comprising a water dispersion of an oil having dissolved therein a toxicant mixture comprising a substance selected from the group consisting of rotenone and rotenone-containing derris-type resins in combination with one of the class consisting of phenothioxin and halogen, alkyl, cycloalkyl, aryl, and aralkyl substituted derivatives thereof in amount sufficient to serve as an activator for the rotenone product.

5. An insecticidal composition comprising 1 part by weight of a substance selected from the group consisting of rotenone and rotenone-containing derris-type resins in combination with from 1 to 16 parts by weight of a material selected from the class consisting of phenothioxin and halogen, alkyl, cycloalkyl, aryl and aralkyl substituted derivatives thereof.

6. An insecticidal composition comprising from 1 to 16 parts by weight of dibenzyl-disulphide, 1 part by weight of a substance selected from the group consisting of rotenone and rotenone-containing derris-type resins, and from 1 to 16 parts by weight of a material selected from the class consisting of phenothioxin and halogen, alkyl, cycloalkyl, aryl and aralkyl substituted derivatives thereof.

7. An insecticidal composition comprising a substance selected from the group consisting of rotenone and rotenone-containing derris-type resins in combination with sufficient phenothioxin to serve as an activator for the rotenone.

8. An insecticidal composition comprising rotenone-containing derris-type resins and sufficient phenothioxin to serve as an activator therefor.

9. An insecticidal composition comprising a non-corrosive organic solvent and dissolved therein a rotenone-containing derris-type resin in combination with sufficient phenothioxin to serve as an activator therefor.

10. An insecticide concentrate comprising an oil, a rotenone-containing derris-type resin, a solubilizing agent for the rotenone product, and sufficient phenothioxin to serve as an activator therefor.

11. An insecticidal spray comprising a water dispersion of an oil having dissolved therein a toxicant mixture comprising rotenone-containing derris-type resins and sufficient phenothioxin to serve as an activator for the resins.

12. An aqueous insecticidal emulsion suitable for application to living plants comprising a vegetable oil and dissolved therein a rotenone-containing derris-type resin and sufficient phenothioxin to serve as an activator for the resin.

13. An insecticidal composition comprising 1 part by weight of a rotenone-containing derris-type resin and from 1 to 16 parts by weight of phenothioxin.

14. An insecticidal composition comprising from 1 to 16 parts by weight of dibenzyl-disulphide, 1 part by weight of a rotenone-containing derris-type resin, and from 2 to 5 parts by weight of phenothioxin.

15. An insecticide concentrate comprising an oil, dibenzyl-disulphide, a substance selected from the group consisting of rotenone and rotenone-containing derris-type resin, a solubilizing agent for the rotenone product, and from 2 to 5 parts by weight of phenothioxin per part of rotenone employed.

16. An insecticidal spray comprising a water dispersion of an oil having dissolved therein a toxicant mixture comprising rotenone, dibenzyl-disulphide, and sufficient phenothioxin to serve as an activator for the rotenone.

17. An aqueous insecticidal emulsion suitable for application to living plants comprising a vegetable oil and dissolved therein a toxicant mixture comprising from 1 to 16 parts by weight of dibenzyl-disulphide, 1 part by weight of rotenone, and from 1 to 16 parts by weight of phenothioxin.

ROBERT J. GEARY.